(No Model.)
J. C. WYNN.
SORGHUM BOILER AND EVAPORATOR.
No. 336,279. Patented Feb. 16, 1886.
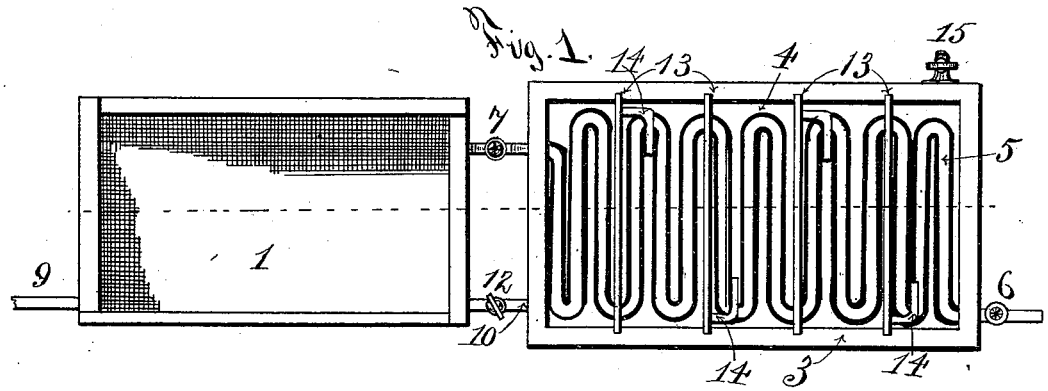
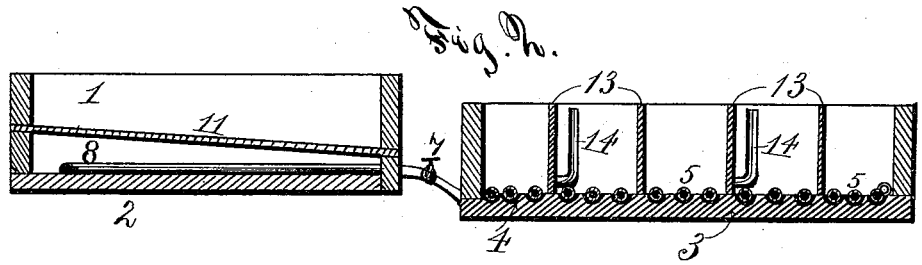
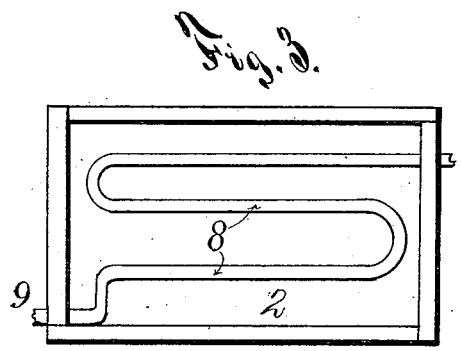
Witnesses.
J. Charleton Ingram.
S. A. Brenton.
Inventor.
John C. Wynn
By his atty
John S. Duffie

UNITED STATES PATENT OFFICE.

JOHN CLINTON WYNN, OF HUNT COUNTY, TEXAS.

SORGHUM BOILER AND EVAPORATOR.

SPECIFICATION forming part of Letters Patent No. 336,279, dated February 16, 1886.

Application filed October 1, 1885. Serial No. 178,713. (No model.)

*To all whom it may concern:*

Be it known that I, JOHN C. WYNN, a citizen of the United States, residing in the county of Hunt and State of Texas, have invented certain new and useful Improvements in Sorghum Boilers and Evaporators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to sorghum boilers and evaporators, the novelty and combination of its parts being hereinafter fully described and set forth in the specification and claims.

In the accompanying drawings, Figure 1 is a top plan view of my invention. Fig. 2 is a longitudinal sectional view of the same, cut through Fig. 1 on the line $xx$. Fig. 3 is a top plan view of the condenser, the heating-pan 1 being removed.

My invention is described as follows: I construct three separate pans, 1, 2, and 3. The pans 1 and 2 are so combined as to form a heating-pan and steam-condenser, the pan 3 forming a boiling or evaporating pan, and may be made of any suitable material and of any size desired. In the bottom of the pan 3 I make a serpentine groove, 4, into which is put a coil of steam-pipe, 5, the front end of which is attached to a steam-generator, the quantity of steam admitted to the coil being controlled by the valve 6. The steam, after passing through the length of the coil in the pan 3, passes through a valve, 7, which controls its entrance into another coil, 8, in the condensing-pan 2, whence it escapes from the end 9 of the pipe protruding from the end wall of the said condensing-pan. The coil 8 in the condensing-pan 3 is surrounded by a suitable non-heat-conducting material, the said pan being filled with said material. On top of the condensing-pan 2 is seated the heating-pan 1, into which the liquid is first poured, the same being warmed by the heat passed off by the steam as it condenses in the coil 8. The pan 1 is so arranged that its bottom 11 will slope toward the front when it is placed on the pan 3, thus giving the liquid a tendency to that end, and as the quantity is diminished in the evaporating-pan 3 it can be replenished through the pipe 10, which connects the said pans, the flow of the liquid being controlled by the stop-cock 12 in said connecting-pipe. The evaporating-pan 3 is divided into a number of compartments by partitions 13, which are secured in slots cut in the sides of said pan. Said partitions may be made of any depth required. Said partitions are provided at their alternate ends with hollow tubes 14, bent in the form of an elbow, the outer arm being long enough to reach to the top of the pan when it is turned up. Said tubes are pivoted into said partitions in such a manner that the outer arm may be turned up to a perpendicular or down to a horizontal position. By means of said elbow-tubes 14, I regulate the flow of the liquid from one compartment to the other, as required, during the process of boiling by turning them to a perpendicular position when I wish to stop the flow, and to a horizontal position, or approximately so, when I wish to add to the quantity of the liquid in any of the compartments. On one side of the pan 3, and near the front end of same, I secure a faucet, 15, through which I draw off the sirup.

Having described my invention, what I claim as new, and desire to secure by Letters Patent, is—

1. In a sorghum boiler and evaporator, the evaporating-pan 3, having the partition-walls 13, the elbow-tubes 14, pivoted in the lower edge of said partitions, and capable of being turned parallel to the bottom of said pan at any angle or perpendicular thereto, copper coil 5, laid in a serpentine groove, 4, made in the bottom of said pan, one end passing through one end of said pan and connecting with a steam-generator, and having a valve, 6, to regulate the flow of steam, the other end of said coil passing through the other end of said pan, and connecting with a coil, 8, laid in the bottom of the condenser 2, and having the valve 7, to regulate the flow of steam into the condenser, substantially as shown and described, and for the purposes set forth.

2. In a sorghum boiler and evaporator, the combination of the evaporating-pan 3, having partition-walls 13, elbow-tubes 14, and copper coil 5, as above described, with condenser 2, having coil 8 laid on the bottom of said condenser, the said pipe being surrounded by some non-heat-conducting material, with warming-pan 1, set on the top of said condenser, having the incline bottom 11, pipe 10, for the flow of the liquid from said pan to evaporating-pan 3, and stop-cock 12, controlling the flow of the liquid, all substantially as shown and described, and for the purposes set forth.

In testimony whereof I affix my signature in presence of two witnesses.

JOHN CLINTON WYNN.

Witnesses:
W. A. ANDERSON,
W. H. McCOWN.